(12) United States Patent
Krishnababu

(10) Patent No.: US 11,365,690 B2
(45) Date of Patent: Jun. 21, 2022

(54) COMPRESSOR CONTROL

(71) Applicant: Siemens Energy Global GmbH & Co. KG, Munich (DE)

(72) Inventor: Senthil Krishnababu, Lincoln (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 116 days.

(21) Appl. No.: 16/767,325

(22) PCT Filed: Dec. 12, 2018

(86) PCT No.: PCT/EP2018/084598
§ 371 (c)(1),
(2) Date: May 27, 2020

(87) PCT Pub. No.: WO2019/121252
PCT Pub. Date: Jun. 27, 2019

(65) Prior Publication Data
US 2021/0025336 A1 Jan. 28, 2021

(30) Foreign Application Priority Data
Dec. 19, 2017 (EP) .................................... 17208567

(51) Int. Cl.
*F02C 9/20* (2006.01)
*F01D 17/16* (2006.01)
*F02C 7/057* (2006.01)

(52) U.S. Cl.
CPC .............. *F02C 9/20* (2013.01); *F01D 17/162* (2013.01); *F02C 7/057* (2013.01);
(Continued)

(58) Field of Classification Search
CPC .......... F01D 17/162; F02C 7/057; F02C 9/20; F05D 2240/12; F05D 2240/35; F05D 2270/02; F05D 2270/101; F05D 2270/304
See application file for complete search history.

(56) References Cited

U.S. PATENT DOCUMENTS 4,295,784 A * 10/1981 Manning ................. F01D 17/20
415/162
4,718,823 A 1/1988 Dennison
(Continued)

OTHER PUBLICATIONS

PCT International Search Report and Written Opinion of International Searching Authority dated Mar. 25, 2019 corresponding to PCT International Application No. PCT/EP2018/084598 filed Dec. 12, 2018.

*Primary Examiner* — Jesse S Bogue

(57) ABSTRACT

A controller operates to control a gas turbine engine which has a first variable guide vane axially spaced apart from a compressor blade array and is rotatably mounted at a first location on a casing, having a vane axis of rotation at right angles to an operational axis. An adjustment drive is operable to rotate the first variable guide vane about its axis of rotation to a range of angles relative to the operational axis. The controller is operable to control the rotation of the first variable guide vane in dependence of engine shaft speed, wherein over a first range of engine shaft speed the angle of the first variable guide vane relative to the operational axis decreases with increasing engine speed, and over a second range of engine shaft speeds, the angle of the first variable guide vane relative to the operational axis increases with increasing engine speed.

12 Claims, 4 Drawing Sheets

(52) U.S. Cl.
CPC ...... *F05D 2240/12* (2013.01); *F05D 2240/35* (2013.01); *F05D 2270/02* (2013.01); *F05D 2270/101* (2013.01); *F05D 2270/304* (2013.01)

(56) References Cited

U.S. PATENT DOCUMENTS

| | | | |
|---|---|---|---|
| 5,595,474 A | 1/1997 | Girard | |
| 8,291,713 B2 * | 10/2012 | Matz | F01D 21/06 |
| | | | 60/773 |
| 9,303,565 B2 * | 4/2016 | Fichtner | F02C 9/20 |
| 10,519,964 B2 * | 12/2019 | Chapman | F01D 17/162 |
| 2011/0182715 A1 | 7/2011 | Leithead et al. | |
| 2016/0281611 A1 | 9/2016 | Stockwell | |
| 2021/0148280 A1 * | 5/2021 | Krausche | F02B 37/24 |

* cited by examiner

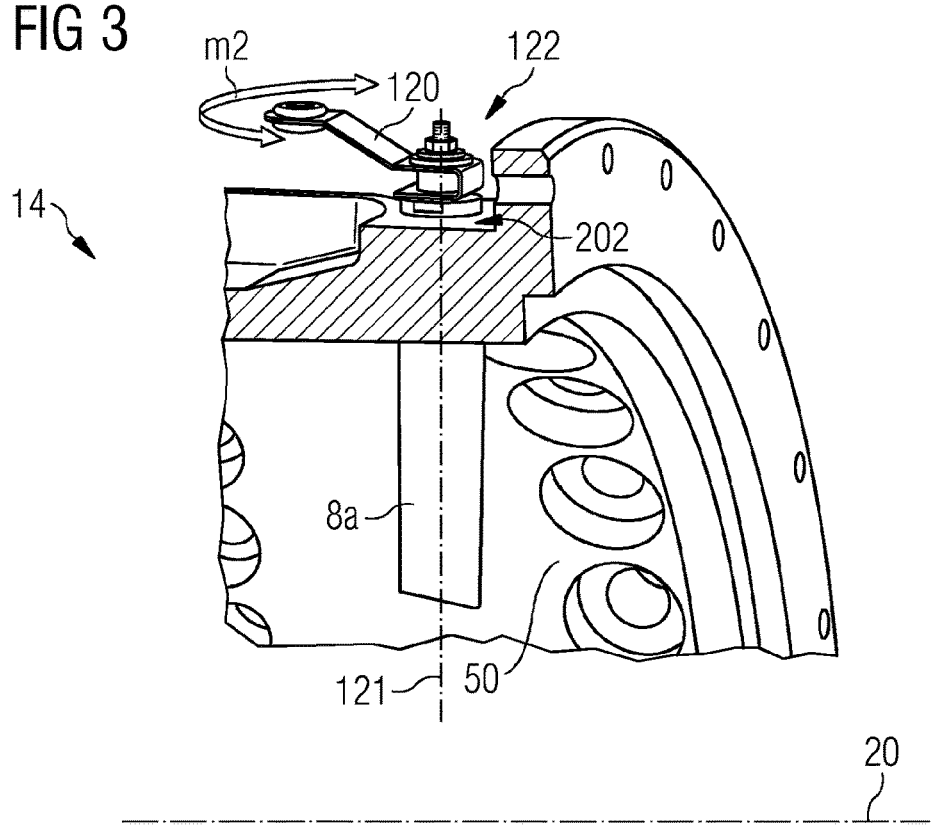
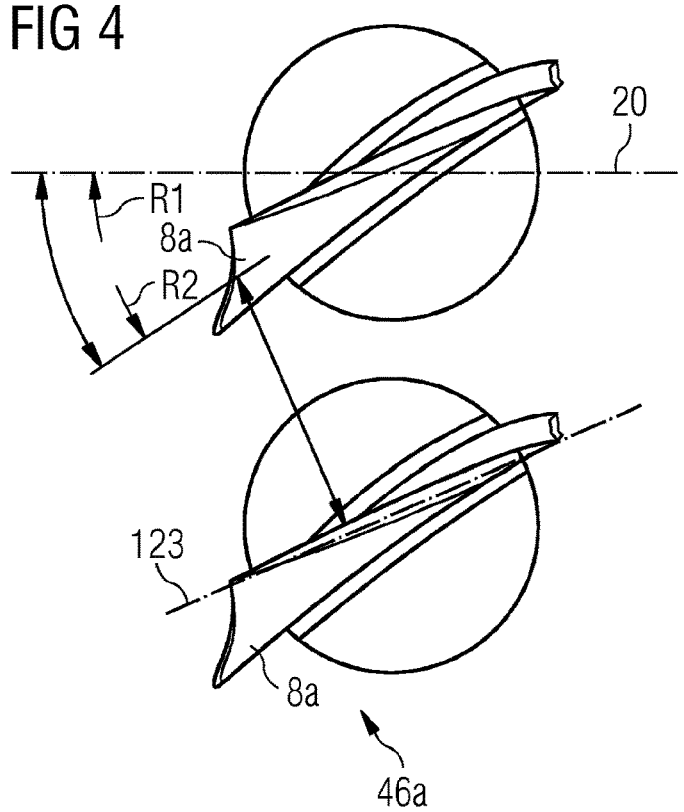

COMPRESSOR CONTROL

CROSS REFERENCE TO RELATED APPLICATIONS

This application is the US National Stage of International Application No. PCT/EP2018/084598 filed 12 Dec. 2018, and claims the benefit thereof. The International Application claims the benefit of European Application No. EP17208567 filed 19 Dec. 2017. All of the applications are incorporated by reference herein in their entirety.

FIELD OF INVENTION

The present disclosure relates to control of a compressor. In particular the disclosure is concerned with control of a compressor for a gas turbine engine.

BACKGROUND

A gas turbine comprises a turbine and a compressor driven by the turbine. A compressor may consist of multiple stages of stator vanes which are non-rotatable about the operational axis, and rotor blades which are rotatable about the operational axis. Commonly, the gas turbine is subjected to varying operating conditions resulting in different aerodynamic flow conditions within the compressor.

In order to adapt the compressor performance to different flow conditions, it is known to provide the compressor with variable guide vanes (VGV). The variable guide vanes are pivotable/rotatable about their longitudinal axis in order to adjust their angle relative to the operational axis of the engine (i.e. the axial flow direction through the compressor), and hence relative to rotor blades downstream.

Operational flow conditions may induce a stall condition during start-up and at off-design conditions. This may result in aerodynamic noise, loss of efficiency and excessive rotor vibration.

In order to avoid such deleterious behaviour, engines may be controlled to avoid combinations of conditions which will result in stall. For example, compressor stall may be reduced by rotating the variable guide vanes to increase the blade angle relative to the operational axis and reduce the compressor throat area, thus reducing the mass flow of air through the compressor.

Unfortunately restricting the operational conditions may have further consequences, for example having an impact on efficiency or power output.

Hence a method of controlling a compressor, and a compressor and/or engine which is operable according to the method, which reduces the likelihood of unwanted aerodynamic behaviour, thus reducing the likelihood of damage to the engine, and at the same time allows the engine to operate over a wider range of conditions, is highly desirable.

SUMMARY

According to the present disclosure there is provided an apparatus, system, method and tangible non-transient computer-readable storage medium as set forth in the appended claims. Other features of the invention will be apparent from the dependent claims, and the description which follows.

Accordingly, there may be provided a controller (300) for a gas turbine engine (10), the gas turbine engine (10) comprising a compressor (14) having a casing (50) which extends along, and is centred on, an operational axis (20). The compressor may also comprise an array (48) of compressor blades coupled to a rotatable engine shaft (22) which extends along the operational axis (20), with a first variable guide vane (8a) axially spaced apart from the compressor blade array (48) along the operational axis (20), wherein the first variable guide vane (8a) is rotatably mounted at a first location (202) on the casing (50), having a vane axis of rotation (121) at right angles to the operational axis (20). The first variable guide vane (8a) may be coupled to an adjustment drive (154) operable to rotate the first variable guide vane (8a) about its axis of rotation (121) to a range (A-D) of angles relative to the operational axis (20). The controller (300) may be operable to control the rotation of the first variable guide vane (8a) in dependence of engine shaft speed wherein over a first range (A-B) and third range (C-D) of engine shaft speed the angle of the first variable guide vane (8a) relative to the operational axis (20) decreases (R1) with increasing engine speed and/or increases (R2) with decreasing engine speed. Over a second range (B-C) of engine shaft speeds the angle of the first variable guide vane (8a) relative to the operational axis (20) increases (R2) with increasing engine speed and/or decreases (R1) with decreasing engine speed.

Over the second range (B-C) of engine shaft speeds, as the first variable guide vane (8a) closes the second variable guide vane (8a) opens at the same time. Similarly, as the first variable guide vane (8a) opens the second variable guide vane (8a) closes at the same time.

There may also be provided a gas turbine engine (10) comprising a compressor having a casing (50) which extends along, and is centred on, an operational axis (20). The compressor may also comprise an array (48) of compressor blades coupled to a rotatable engine shaft (22) which extends along the operational axis (20), a first variable guide vane (8a) axially spaced apart from the compressor blade array (48) along the operational axis (20), wherein the first variable guide vane is rotatably mounted at a first location (202) on the casing (50), having a vane axis of rotation (121) at right angles to the operational axis (20). The first variable guide vane (8a) may be coupled to an adjustment drive (154) operable to rotate the first variable guide vane (8a) about its axis of rotation (121) to a range (A-D) of angles relative to the operational axis (20). The compressor and/or engine may also comprise a controller (300) operable to control the rotation of the first variable guide vane (8a) in dependence of engine shaft speed wherein: over a first range (A-B) and third range (C-D) of engine shaft speed the angle of the first variable guide vane (8a) relative to the operational axis (20) may decrease (R1) with increasing engine speed and/or increases (R2) with decreasing engine speed. Over a second range (B-C) of engine shaft speeds the angle of the first variable guide vane (8a) relative to the operational axis (20) may increase (R2) with increasing engine speed and/or decreases (R1) with decreasing engine speed.

There may also be provided a method of controlling a gas turbine engine (10) according to the present disclosure. The method may comprise controlling the rotation of the first variable guide vane (8a) in dependence of engine shaft speed wherein over a first range (A-B) and third range (C-D) of engine shaft speed the angle of the first variable guide vane (8a) relative to the operational axis (20) may decrease (R1) with increasing engine speed and/or increase (R2) with decreasing engine speed. Over a second range (B-C) of engine shaft speeds the angle of the first variable guide vane (8a) relative to the operational axis (20) may increase (R2) with increasing engine speed; and/or decrease (R1) with decreasing engine speed.

The second range (B-C) of engine shaft speeds may be between first range (A-B) and third range (C-D).

The first range (A-B) may have a maximum value no greater than the minimum value of the second range (B-C); and the second range (B-C) may have a maximum value no greater than the minimum value of the third range (C-D).

In some circumstance it is possible that the normalised angle of any one or all of the guide vanes (8a, 8b, 8c and 8d) are constant, i.e. do not change in angle, in the first range (A-B).

The rate of change of angle per unit change of engine shaft speed of the first variable guide vane (8a) relative to the operational axis (20) may be greater in the third range (C-D) than in the first range (A-B).

The first range (A-B) may be from 0 to 80% engine shaft speed. The second range may be from 80% to 90% engine shaft speed. The third range may be from 90% to 100% engine shaft speed.

The first range (A-B) may be from 0% to no more than 80% engine shaft speed. The second range may be from no less than 80% to no more than 95% engine shaft speed. The third range may be from no less than 95% to no more than 100% engine shaft speed.

The compressor may further comprise a second variable guide vane (8b) axially spaced apart from the first variable guide vane (8a) along the operational axis (20), wherein the second variable guide vane (8b) is rotatably mounted at a second location (204) on the casing (50), having a vane axis of rotation (121b) at right angles to the operational axis (20); and the second variable guide vane (8b) is coupled to the adjustment drive (154); operable to rotate the second variable guide vane (8b) about its axis of rotation (121) to a range of angles relative to the operational axis (20) at the same time as rotating the first variable guide vane. The method may further comprise the step of controlling the rotation of the second variable guide vane (8b) in dependence of engine shaft speed wherein: over the first range (A-B), second range (B-C) and third range (C-D) of engine shaft speed the angle of the second variable guide vane (8b) relative to the operational axis (20): decreases (R1) with increasing engine speed; and/or increases (R2) with decreasing engine speed.

The rotation of the variable guide vanes may be controlled such that: over the first range (A-B) of engine shaft speeds the angle of the first variable guide vane (8a) and second variable guide vane (8b) relative to the operational axis (20) changes at the same rate.

The rotation of the variable guide vanes may be controlled such that: over the third range (C-D) of engine shaft speeds the angle of the first variable guide vane (8a) changes at a greater rate than the second variable guide vane (8b).

The adjustment drive (154) may comprise one actuator (156) coupled to both the first variable guide vane (8a) and second variable guide vane (8b).

The adjustment drive (154) may comprise a first actuator (156) and second actuator (156'), the first actuator (156) coupled to the first variable guide vane (8a); and the second actuator (156') coupled to the second variable guide vane (8b); and the controller (300) is operable to control both of the actuators (156, 156') of the adjustment drive (154).

There may also be provided a tangible non-transient computer-readable storage medium having recorded thereon instructions which when implemented by a controller for a gas turbine according to the present disclosure causes the controller to perform a method of controlling the gas turbine according to the present disclosure.

Hence there is provided a system for performing a variable guide vane schedule for improved compressor operability. The schedule is designed to induce one or several changes of direction of at least one variable guide vane stage. The schedule is also designed so that the angle of at least one variable vane stage can be varied relative to other variable guide vane stages. This provides sufficient control to air flow to avoid stall.

Hence control may be achieved by gradually closing or opening the first stage variable guide vane while gradually opening or closing (respectively) the later variable guide vane stages over predetermined engine operating conditions. In this way loading on the downstream rotor blades is reduced thus avoiding a stall condition and other deleterious blade dynamic issues.

BRIEF DESCRIPTION OF THE DRAWINGS

Examples of the present disclosure will now be described with reference to the accompanying drawings, in which:

FIG. 3 shows an enlarged region of the compressor assembly shown in FIG. 2;

FIG. 4 shows another enlarged region of the compressor assembly shown in FIG. 2.

DETAILED DESCRIPTION

The present disclosure relates to a controller (300) for a gas turbine engine (10), the gas turbine engine (10) comprising a compressor. The present disclosure also relates to a gas turbine engine, a method of controlling the gas turbine engine, and tangible non-transient computer-readable storage medium By way of context, FIGS. 1 to 4 show an engine and compressor arrangement to which features of the present disclosure may be applied. However, features of the present disclosure may be applied to other arrangements also, for example containing different or alternative combinations of features.

Figure 1:
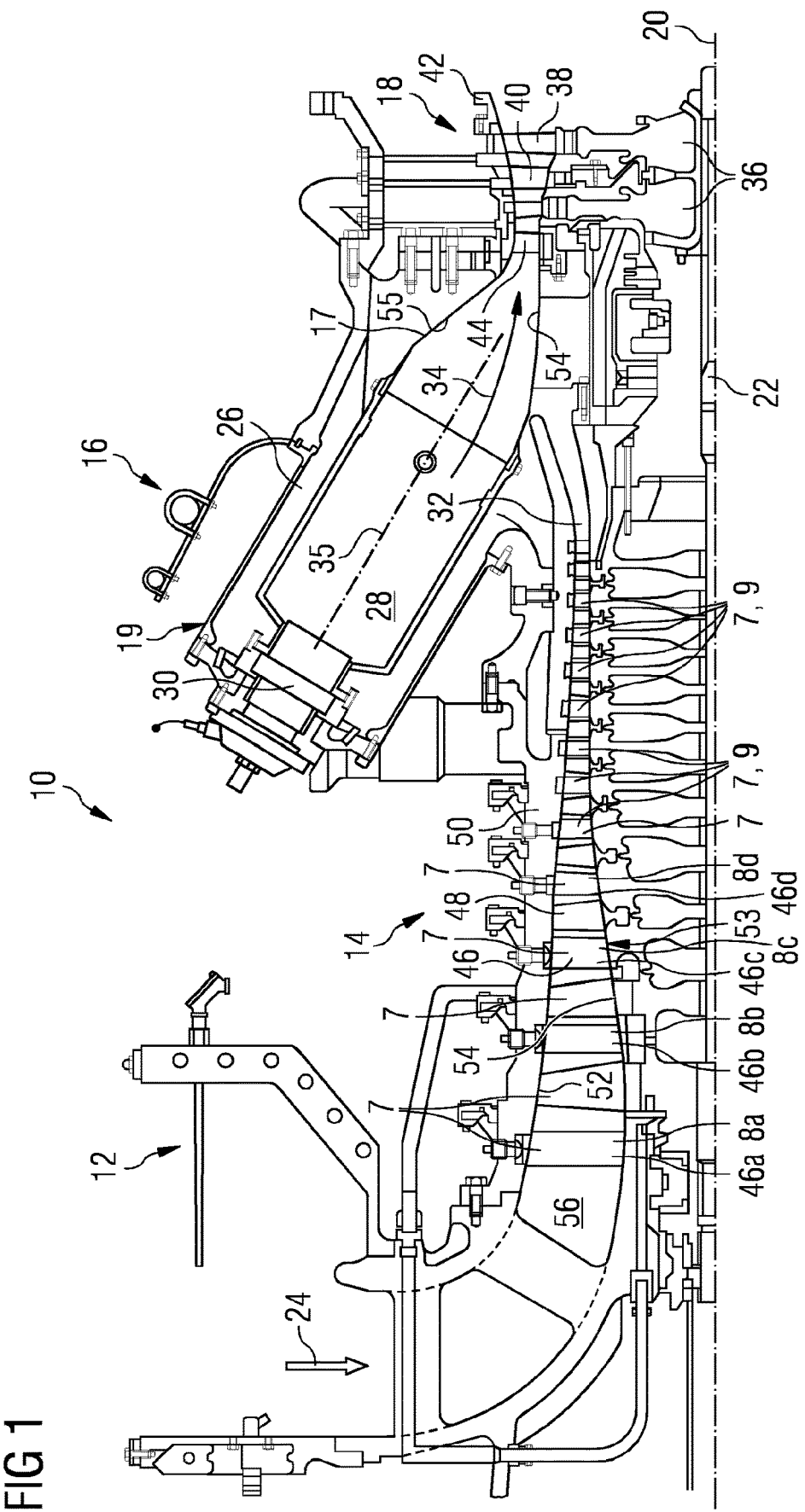
FIG. 1 shows a schematic representation of an example of a turbomachine.

FIG. 1 shows an example of a gas turbine engine 10 in a sectional view. The gas turbine engine 10 comprises, in flow series, an inlet 12, a compressor or compressor section 14, a combustor section 16 and a turbine section 18 which are generally arranged in flow series and generally about and in the direction of a rotational axis 20. The rotational axis may also be termed the "operational axis", the direction of flow through the compressor being generally aligned with the operational/rotational axis. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor 14 and delivered to the combustion section or burner section 16. The burner section 16 comprises a burner plenum 26, one or more combustion chambers 28 extending along a longitudinal axis 35 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channelled through the combustion chamber 28 to the turbine section 18 via a transition duct 17.

This exemplary gas turbine engine 10 has a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. An annular array of transition duct outlets form an annulus for channelling the combustion gases to the turbine 18.

The turbine section 18 comprises a number of blade carrying discs 36 attached to the shaft 22. In the present example, two discs 36 each carry an annular array of turbine blades 38 are shown. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 44 are provided and turn the flow of working gas onto the turbine blades 38.

The combustion gas 34 from the combustion chamber 28 enters the turbine section 18 and drives the turbine blades 38 which in turn rotate the shaft 22. The guiding vanes 40, 44 serve to optimise the angle of the combustion or working gas 34 on the turbine blades 38.

The turbine section 18 drives the compressor 14, i.e. particularly a compressor rotor, via the shaft 22.

The compressor 14 comprises an axial series of vane stages 46, or guide vane stages 46, and rotor blade stages 48. The rotor blade stages 48 comprise a rotor disc supporting an annular array of blades. The compressor 14 also comprises a casing 50 that surrounds the rotor blade stages 48 and supports the guide vane stages 46. The casing 50 extends along, and is centred on, the operational axis 20. The guide vane stages 46 include an annular array of radially extending guide vanes 7 that are mounted to the casing 50. The guide vanes 7, hereinafter also referred to as the vanes 7, are provided to present gas flow at an optimal angle for the blades of the rotor blade stage 48 that is present adjacent to and downstream of, with respect to a flow direction of the air 24 along the compressor 14 at a given engine operational point.

The casing 50 defines a radially outer surface 52 of the passage 56 of the compressor 14. The guide vane stages 46 and the rotor blade stages 48 are arranged in the passage 56, generally alternately axially. The passage 56 defines a flow path for the air through the compressor 14 and is also referred to as an axial flow path 56 of the compressor 14. The air 24 coming from the inlet 12 flows over and around the guide vane stages 46 and the rotor blade stages 48. A radially inner surface 54 of the passage 56 is at least partly defined by a rotor drum 53 of the rotor which is partly defined by the annular array of blades.

Some of the guide vane stages 46 have variable guide vanes 8 (shown as vanes 8a, 8b, 8c, 8d), where the angle of the guide vanes 8, about their own longitudinal axis, can be adjusted for angle according to air flow characteristics that can occur at different engine operations conditions. Some of the other guide vane stages 46 have stationary guide vanes 9 where the angle of the guide vanes 9, about their own longitudinal axis, is fixed and thus not adjustable for angle.

The present method, apparatus and system is described with reference to the above exemplary turbine engine having a single shaft or spool connecting a single, multi-stage compressor and a single, one or more stage turbine. However, it should be appreciated that the present system and method is equally applicable to two or three shaft engines and which can be used for industrial, aero or marine applications. Furthermore, the cannular combustor section arrangement 16 is also used for exemplary purposes and it should be appreciated that the present technique is equally applicable to gas turbine engines 10 having annular type and can type combustion chambers.

The terms axial, radial and circumferential are made with reference to the rotational axis 20 of the engine, unless otherwise stated.

Figure 2:
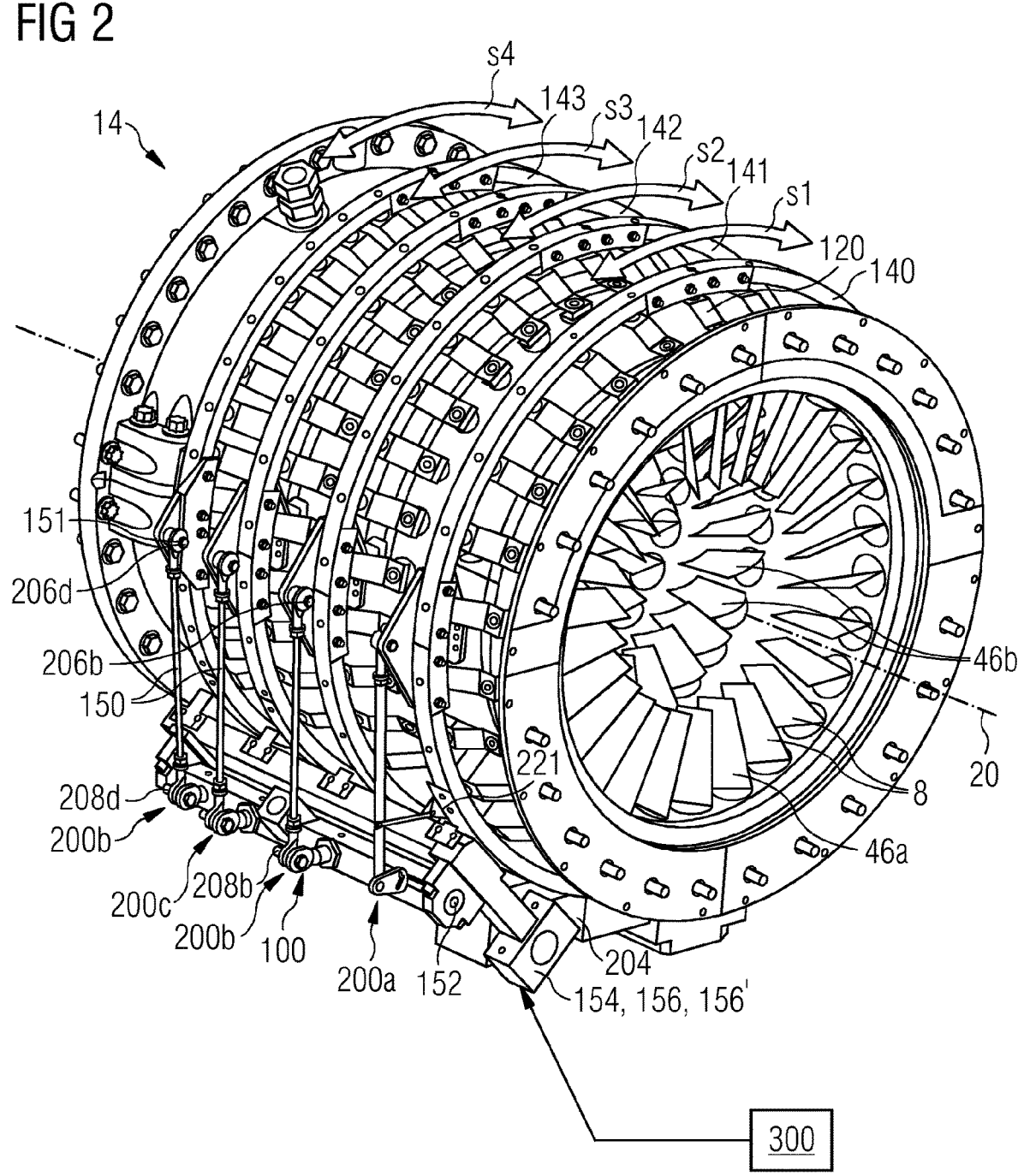
FIG. 2 is a view of a compressor assembly.

In the example shown in FIG. 2, the pitch or the angular offset for the individual stages of variable guide vanes 8a-d inside of the compressor wall 50 is controlled via a linkage mechanism 100 which is applied from the outside of the wall.

Each individual vane 8a (first stage 46a), 8b (second stage 46b), 8c (third stage 46c), 8d (fourth stage 46d) may be mounted on a spindle 122 to allow angular movement of the vane 8a, 8b. FIG. 3 shows an individual vane 8a of the first stage, e.g. the most upstream stage of the compressor and a corresponding lever 120. FIG. 4 shows a view along the length of vanes 8a showing how they rotate about their axis of rotation 121.

As shown in FIG. 2, the lever 120 may connect the spindle 122 to a driving ring 140, provided as an adjustment ring, the so called unison ring. Each vane 8 of each stage 46 is connected to its respective unison ring via a lever 120. That is to say, the lever 120 connects the spindle 122 of each vane to a respective driving ring 140, 141, 142, 143.

All vanes 8 in a single stage may be connected to the same ring so that all vanes 8 on one stage 46 are adjusted at the same time and with the same angle.

Each of the driving rings 140, 141, 142, 143 may be rotated via a push rod 150, one per ring, by a distributor drive 154.

The distributor drive may comprise only a single actuator (i.e. a drive). Hence a single drive may provide an input to act on all of the push rods 150, unison rings 140-143 and hence guide vanes.

Alternatively, the distributor drive may comprise two or more actuators. Hence one actuator may drive one or more unison rings and the other actuator drives the remaining unison ring(s). Hence multiple drives may provide an input to act on all of the push rods 150, unison rings 140-143 and hence guide vanes.

The rotational movement of the driving rings 140, 141, 142, 143 (shown as arrows s1, s2, s3, s4) may be applied via the lever 120 as a rotational movement as indicated via arrow m2 to the lever 120 of each vane 8a to 8d. Thus, the movement of the distributor drive shaft 152 results in a rotation of vanes 8a to 8d as indicated in FIGS. 3, 4.

Regardless of the specifics of the variable guide vane actuation arrangement, a gas turbine engine 10 according to the present disclosure comprises a compressor having a casing 50 which extends along, and is centred on, an operational axis 20. An array 48 of compressor blades coupled to a rotatable engine shaft 22 extend along the operational axis 20, and a first variable guide vane 8a is axially spaced apart from the compressor blade array 48 along the operational axis 20. The first variable guide vane is rotatably mounted at a first location 202 on the casing 50, having a vane axis of rotation 121 which extends radially from and at right angles to the operational axis 20. The first variable guide vane 8a is coupled to an adjustment drive 154 which is operable to rotate the first variable guide vane 8a about its axis of rotation 121 to a range A-D of angles (i.e. angular orientations) relative to the operational axis 20.

The angle of the variable guide vane relative to the operational axis 20 may be considered in terms of the angle a chord line 123 which extends between the vane leading edge and trailing edge makes with the operational axis 20, for example as shown in FIG. 4.

A feature common to all examples covered by the present disclosure is that the first stage 46a is operated in concert with the later stages 46b, 46c, 46d. However, stages 46b, 46c, 46d are in synchronisation with each other, but stage 46a is configured to open and close to a different schedule.

Put another way, the opening/closing of the stages 46b, 46c, 46d is synchronous in that they all open and close at the same time, whereas the opening/closing of the stages 46a is asynchronous relative to the other stages in that the first stage 46a may be opening when the other stages are closing and may close at a different rate to the other stages. This is best illustrated with reference to FIG. 5.

Figure 5:
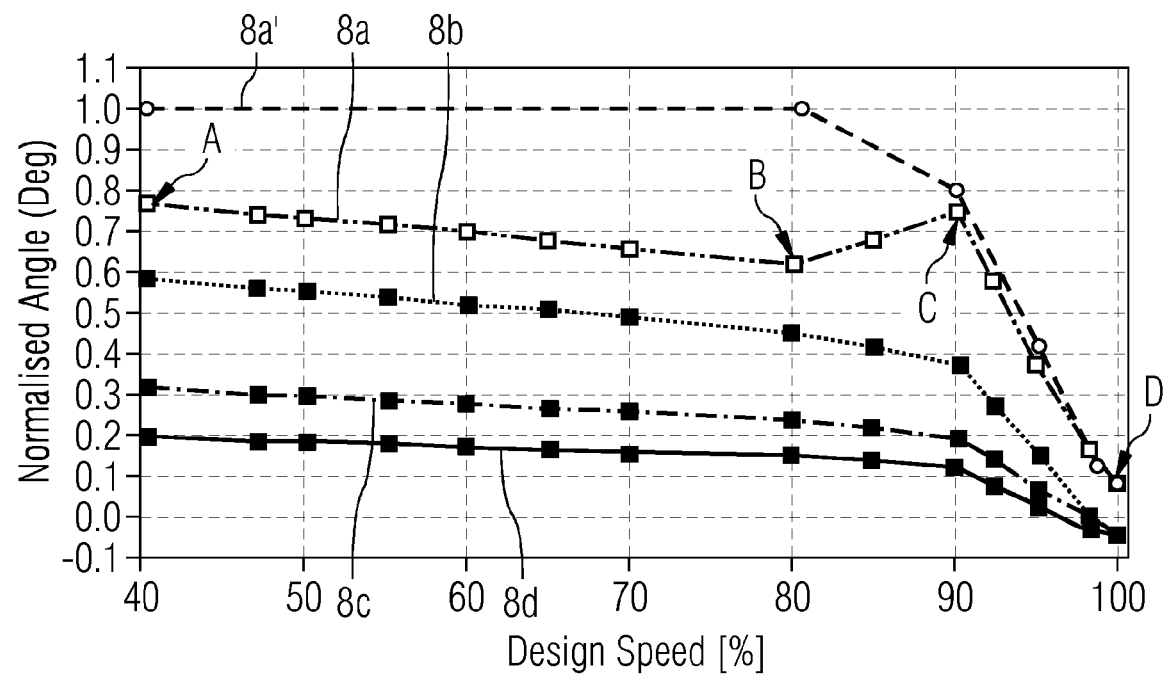
FIG. 5 shows an example of variable guide vane movement profiles according to the method, apparatus and system of the present disclosure.

FIG. 5 shows a plot of variable guide vane angle plotted against engine speed for vanes 8a, 8b, 8c, 8d of different stages 46a, 46b, 46c, 46d. As can be seen with reference to the profile schedule for vanes 8b, 8c, 8d, at low engine speed the vanes are disposed at a first angle relative to the operational axis 20 (and/or direction of flow through the compressor), and as engine speed increases the vanes are rotated relative to the operational axis 20 (for example in direction R2 as shown in FIG. 4) such that they are at their most "open" configuration at highest engine speed to allow maximum air flow.

In a conventional compressor for a gas turbine engine the vanes of the first stage 46a would follow the same pattern, as indicated by the profile marked 8a' in FIG. 5.

However, for the arrangement of the present disclosure, the profile for the first stage corresponds to the schedule is as shown for 8a in FIG. 5.

As shown in FIG. 2 the gas turbine engine comprises a controller 300 operable to control the rotation of the first variable guide vane 8a in dependence of engine shaft speed, for example as illustrated in FIG. 5.

The controller 300 may form part of an engine control unit and may be fitted to any suitable location on or near the engine and/or compressor. The controller 300 is linked to, and operable to control, the distributor drive 154 to thereby control the variable guide vanes 8a, 8b, 8c, 8d.

Hence regardless of how the variable guide vanes 8a, 8b, 8c, 8d are actuated/rotated, their orientation, direction of rotation and rotational speed is controlled by the controller 300.

With reference to FIG. 5, the controller 300 is operable to control the rotation of the variable guide vanes 8a such that over a first range (A-B) and third range (C-D) of engine shaft speed the angle of the first variable guide vane 8a relative to the operational axis 20 decreases (i.e. turns in direction R1 as shown in FIG. 4 to increase flow area between vanes 8a) with increasing engine speed and/or increases (i.e. turns in direction R2 as shown in FIG. 4 to decrease flow area between vanes 8a with decreasing engine speed. Also with reference to FIG. 5, the controller 300 may also be operable to control the rotation of the variable guide vanes 8a such that over a second range (B-C) of engine shaft speeds the angle of the first variable guide vane 8a relative to the operational axis 20 increases (i.e. turns in direction R2) with increasing engine speed and/or decreases (i.e. turns in direction R1) with decreasing engine speed.

Hence there is provided a controller 300 operable to rotate the first variable guide vane 8a about its axis of rotation 121 to a range A-D of angles (that is to say angular orientations in directions R1, R2 relative to the operational axis 20. Thus the controller 300 is operable to control the rotation of the first variable guide vane 8a in dependence of engine shaft speed wherein over a first range A-B and third range C-D of engine shaft speed the angle of the first variable guide vane 8a relative to the operational axis 20 decreases (i.e. turns in direction R1 direction with increasing engine speed; and/or increases (i.e. turns in direction R2 with decreasing engine speed. Over a second range B-C of engine shaft speeds the angle of the first variable guide vane 8a relative to the operational axis 20 increases (i.e. turns in direction R2) with increasing engine speed; and/or decreases (i.e. turns in direction R1) with decreasing engine speed.

As shown in FIG. 4 the first rotational direction R1 is opposite to the second rotational direction R2.

As described above, the variable guide vane 8a may be one of an array of variable guide vanes 8a arranged around the circumference of the casing 50 to form at least part of the first flow stage 46a.

As also described, there may also be provided a further arrays/stages 46b, 46c, 46d of variable guide vanes 8b, 8c, 8d respectively arranged around the circumference of the casing 50 to form at least part of a further flow stage 46b, 46c, 46d spaced apart from the first flow stage 46a along the operational axis 20.

Hence there may be provided a second (or more) array/stage 46b, 46c, 46d of variable guide vanes 8b, 8c, 8d arranged around the circumference of the casing 50 to form at least part of a second, third and/or fourth flow stage 46b, 46c, 46d spaced apart from the first flow stage 46a along the operational axis 20.

Hence there may also be provided a second variable guide vane 8b axially spaced apart from the first variable guide vane 8a along the operational axis 20 wherein the second variable guide vane 8b is rotatably mounted at a second location 204 on the casing 50, having a vane axis of rotation 121b extending radially from and at right angles to the operational axis 20. The second variable guide vane 8b may be coupled to the adjustment drive 154 which is operable to rotate the second variable guide vane 8b about its axis of rotation 121 to a range A-D of angles (angular orientations) relative to the operational axis 20 at the same time as rotating the first variable guide vane 8a.

When an axial compressor 14 with several stages is running the compression of the air passing through it is achieved progressively, with similar compression ratios at each stage, so the area of the gas path through the compressor is designed to reduce progressively. At very low speeds, encountered during starting and shutting down of the engine, the early stages variable guide vanes 8a, 8b do not provide sufficient compression to enable the air flow to pass through the rear (downstream) vane stages 46c, 46d which become "choked". When this occurs flow can separate from aerofoil surfaces causing "stall" and flow reversal in all stages of the compressor 14. As this occurs the high-pressure air exiting the compressor flows back through the compressor 14 creating a pressure wave (called "surge"). Normally surges will occur repeatedly until the engine is stopped.

However, the arrangement of the present disclosure controls air flows to avoid the stall condition arising. FIG. 5 illustrates the relative movements of the first stage 46a to later stages 46*b*, 46*c*, 46*d* in an arrangement according to the present disclosure which has been determined to affect air flows such that stall and/or other deleterious air flow conditions will be inhibited from occurring by virtue of a the first stage 46*a* being restricted compared to the other stages at predetermined engine conditions.

At low speed the variable guide vanes are "closed" (i.e. turned in direction R2 to restrict flow to their maximum extent) and as engine speed increases the variable guide vanes 8*a* to 8*d* are opened in direction R1 to their running position in order to pass more flow.

There is thus provided a control method controlling the rotation of the first variable guide vane 8*a* in dependence of engine shaft speed. Over a first range A-B and third range C-D of engine shaft speed the angle of the first variable guide vane 8*a* relative to the operational axis 20 decreases (i.e. turns in direction R1) with increasing engine speed and/or increases (i.e. turns in direction R2) with decreasing engine speed. Over a second range B-C of engine shaft speeds the angle of the first variable guide vane 8*a* relative to the operational axis 20 increases (i.e. turns in direction R2) with increasing engine speed and/or decreases (i.e. turns in direction R1) with decreasing engine speed.

The second range (B-C) of engine shaft speeds may be between first range (A-B) and third range (C-D).

The first range (A-B) may have a maximum value no greater than the minimum value of the second range (B-C). The second range (B-C) may have a maximum value no greater than the minimum value of the third range (C-D).

The rate of change of angle per unit change of engine shaft speed of the first variable guide vane 8*a* relative to the operational axis 20 may be greater in the third range (C-D) than in the first range (A-B).

The control method may further comprise the step of controlling the rotation of the second variable guide vane 8*b* in dependence of engine shaft speed wherein over the first range (A-B), second range and third range (C-D) of engine shaft speed the angle of the variable guide vane 8*a* relative to the operational axis 20 decreases (i.e. turns in direction R1) with increasing engine speed and/or increases (i.e. turns in direction R2) with decreasing engine speed. In the step of controlling the rotation of the second variable guide vane 8*b* in dependence of engine shaft speed, the second variable guide vane 8*b* is driven via the first variable guide vane 8*a* such that it is in mechanical relationship or mechanically coupled (i.e. the adjustment drive 154) with the first variable guide vane 8*a*. The first variable guide vane 8*a* may be an inlet guide vane.

As shown in FIG. 5, over the first range (A-B) of engine shaft speeds the angle of the first variable guide vane 8*a* and second variable guide vane 8*b* relative to the operational axis 20 changes at substantially the same rate.

The rotation of the variable guide vanes may be controlled such that over the third range (C-D) of engine shaft speeds the angle of the first variable guide vane 8*a* changes at a substantially greater rate than the second variable guide vane 8*b*.

The adjustment drive 154 may comprise one actuator 156 coupled to both the first variable guide vane 8*a* and second variable guide vane 8*b*.

Alternatively, the adjustment drive 154 may comprise a first actuator 156 and second actuator 156', the first actuator 156 coupled to the first variable guide vane 8*a*; and the second actuator 156' coupled to the second variable guide vane 8*b*; and the controller 300 is operable to control both of the actuators 156, 156' of the adjustment drive 154.

Additionally, the second flow stage and the first flow stage are configured such that the vanes 8*b* of the second flow stage 46*b* will move by a different amount and/or in a different direction to the variable vanes of the first flow stage 46*a* at a predetermined flow condition in the compressor 14. The predetermined flow condition may be expressed in terms of engine speed. That is to say, and with reference to FIG. 5, the control method may define that point "B" is at a first % of maximum engine speed, and point "C" is a second % of maximum engine speed.

Point "B" may be in the range of 70% to 80% of maximum engine speed, and point C is in the range of 85% to 95% of maximum engine speed.

Point "B" may be at 80% of maximum engine speed, and point C may be at 90% of maximum engine speed.

Alternatively point "B" may be at 80% of maximum engine speed, and point C may be at 95% of maximum engine speed.

In one example, the first engine speed range (A-B) may be from 0 to 80% engine shaft speed. The second engine speed range (B-C) may be from 80% to 90% engine shaft speed. The third range (C-D) may be from 90% to 100% engine shaft speed or even from 90% to 105% engine shaft speed.

In an alternative example the first range (A-B) may be from 0% to no more than 80% engine shaft speed. The second range (B-C) may be no less than 80% to no more than 95% engine shaft speed. The third range (C-D) is from no less than 95% to no more than 105% engine shaft speed.

There may also be provided a non-transient computer-readable storage medium having recorded thereon instructions which when implemented by the controller 300 for the gas turbine 10 cause the controller 300 to perform a method of controlling the gas turbine 10 according to the method of the present disclosure.

Hence there is provided a means to operate a variable guide vane for a compressor to a schedule for improved compressor operability. The system comprises a controller, an engine and/or a method which advantageously closes a first stage variable inlet guide vane of the compressor while opening the other compressor stages. Normally stall is avoided by opening all stages of the compressor, but for compressor flow conditions where this is not effective, the system of the present disclosure provides further resistance to stall.

Hence the system of the present disclosure provides an extension to stall/surge margin as well as avoiding/reducing strength of stall should it occur, and also reducing "forcing" of downstream rotor blades to reduce deleterious blade dynamics issues.

Thus there is provided an arrangement which enables a "programmed" schedule (i.e. a predetermined movement profile) of operation for a variable guide vane stage to avoid stall and other potentially damaging air flow conditions. It also enables several variable guide vane stages to be operated to different predetermined opening/closing schedules to avoid stall and other potentially damaging air flow conditions.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gas turbine comprising:
a compressor having a casing which extends along, and is centered on, an operational axis; an array of compressor blades coupled to a rotatable engine shaft which extends along the operational axis;
a first variable guide vane axially spaced apart from the compressor blade array along the operational axis, wherein the first variable guide vane is rotatably mounted at a first location on the casing, having a vane axis of rotation at right angles to the operational axis; and the first variable guide vane is coupled to an adjustment drive operable to rotate the first variable guide vane about its axis of rotation to a range of angles relative to the operational axis; and
a controller operable to control the rotation of the first variable guide vane in dependence of engine shaft speed; such that,
within a first range and within a third range of engine shaft speed, the angle of the first variable guide vane relative to the operational axis decreases with increasing engine shaft speed; and/or increases with decreasing engine shaft speed; and
within a second range of engine shaft speeds, the angle of the first variable guide vane relative to the operational axis increases with increasing engine shaft speed; and/or decreases with decreasing engine shaft speed,
wherein the rate of change of angle per unit change of engine shaft speed of the first variable guide vane relative to the operational axis is greater in the third range than in the first range.

2. The gas turbine as claimed in claim 1,
wherein the second range of engine shaft speeds is between first range and third range.

3. The gas turbine as claimed in claim 2,
wherein the first range has a maximum value no greater than the minimum value of the second range; and
wherein the second range has a maximum value no greater than the minimum value of the third range.

4. The gas turbine as claimed in claim 1,
wherein the first range is from 0 to 80% of a maximum engine shaft speed;
wherein the second range is from 80% to 90% of a maximum engine shaft speed; and
wherein the third range is from 90% to 100% of a maximum engine shaft speed.

5. The gas turbine as claimed in claim 1,
wherein the first range is from 0% to no more than 80% of a maximum engine shaft speed;
wherein the second range is from no less than 80% to no more than 95% of a maximum engine shaft speed; and
wherein the third range is from no less than 95% to no more than of a maximum 100% engine shaft speed.

6. The gas turbine as claimed in claim 1,
wherein the compressor further comprises: a second variable guide vane axially spaced apart from the first variable guide vane along the operational axis, wherein the second variable guide vane is rotatably mounted at a second location on the casing, having a vane axis of rotation at right angles to the operational axis; and the second variable guide vane is coupled to the adjustment drive; operable to rotate the second variable guide vane about its axis of rotation to a range of angles relative to the operational axis at the same time as rotating the first variable guide vane;
the controller further operable to control:
the rotation of the second variable guide vane in dependence of engine shaft speed, such that, within the first range, the second range and the third range of engine shaft speed, the angle of the second variable guide vane relative to the operational axis decreases with increasing engine shaft speed; and/or increases with decreasing engine shaft speed.

7. The gas turbine as claimed in claim 6,
wherein the rotation of the variable guide vanes is controlled such that, over the first range of engine shaft speeds, the angle of the first variable guide vane and second variable guide vane relative to the operational axis changes at the same rate.

8. The gas turbine as claimed in claim 6,
wherein the rotation of the variable guide vanes is controlled such that, over the third range of engine shaft speeds, the angle of the first variable guide vane changes at a greater rate than the second variable guide vane.

9. The gas turbine as claimed in claim 8,
wherein the adjustment drive comprises one actuator coupled to both the first variable guide vane and second variable guide vane.

10. The gas turbine as claimed in claim 8,
wherein the adjustment drive comprises a first actuator and second actuator, wherein the first actuator coupled to the first variable guide vane; and wherein the second actuator coupled to the second variable guide vane; and
wherein the controller is operable to control both of the actuators of the adjustment drive.

11. The gas turbine as claimed in claim 6,
wherein the control of the rotation of the first stage variable guide vane and the second variable guide vane stages is achieved by gradually closing the first stage variable guide vane while gradually opening the later variable guide vane stages over predetermined engine operating conditions.

12. The gas turbine as claimed in claim 6,
wherein the control of the rotation of the first stage variable guide vane and the second variable guide vane stages is achieved by gradually opening the first stage variable guide vane while gradually closing the later variable guide vane stages over predetermined engine operating conditions.

* * * * *